(12) United States Patent
Zhu

(10) Patent No.: US 9,637,194 B1
(45) Date of Patent: May 2, 2017

(54) SCOOTER FOR KIDS

(71) Applicant: Huimin Zhu, Guangzhou (CN)

(72) Inventor: Huimin Zhu, Guangzhou (CN)

(*) Notice: Subject to any disclaimer, the term of this patent is extended or adjusted under 35 U.S.C. 154(b) by 0 days.

(21) Appl. No.: 15/138,236

(22) Filed: Apr. 26, 2016

(30) Foreign Application Priority Data

Feb. 3, 2016 (CN) .......................... 2016 1 0075058

(51) Int. Cl.
*B62K 21/08* (2006.01)
*B62K 3/00* (2006.01)

(52) U.S. Cl.
CPC .............. *B62K 21/08* (2013.01); *B62K 3/002* (2013.01)

(58) Field of Classification Search
CPC ........ B62K 21/08; B62K 21/04; B62K 21/06; B62K 21/12; B62K 21/18; B62K 21/20; B62K 3/002; B62K 9/00; B62B 3/007
USPC ............... 280/87.01, 87.021, 87.041, 87.043
See application file for complete search history.

(56) References Cited

U.S. PATENT DOCUMENTS

| | | | |
|---|---|---|---|
| 6,409,191 B1* | 6/2002 | Wang | B62K 3/002 280/87.03 |
| 8,939,454 B2* | 1/2015 | Stillinger | B62K 3/002 280/271 |
| 2002/0167143 A1* | 11/2002 | Shaw | A63C 17/01 280/87.041 |
| 2006/0033297 A1* | 2/2006 | Miller | B62K 3/002 280/87.021 |
| 2009/0273152 A1* | 11/2009 | Chung | B62K 3/002 280/87.042 |

* cited by examiner

*Primary Examiner* — John Walters
(74) *Attorney, Agent, or Firm* — Matthias Scholl, PC; Matthias Scholl

(57) ABSTRACT

A scooter for kids, including a scooter head and a main body connected to the scooter head. A rotating and positioning mechanism is disposed between the scooter head and the main body. The rotating and positioning mechanism includes a front body and a rear body. The front body is integrated with the rear body via a fixer to form a rotatable body. The back surface of the rear body is provided with a socket, and a connection rod was disposed in the socket. The outer end of the connection rod is provided with a first button. The connection rod is sheathed with a first spring, and the first spring is disposed in the socket.

6 Claims, 6 Drawing Sheets

SCOOTER FOR KIDS

CROSS-REFERENCE TO RELATED APPLICATIONS

Pursuant to 35 U.S.C. §119 and the Paris Convention Treaty, this application claims the foreign priority benefit of Chinese Patent Application No. 201610075058.1 filed Feb. 3, 2016, the contents of which, are incorporated herein by reference.

BACKGROUND OF THE INVENTION

Field of the Invention

The invention relates to a scooter for kids.

Description of the Related Art

The assembly and disassembly of conventional scooters involve complex operation steps and a great number of bolts. The assembled scooters often have poor stability, and the bolts tend to loosen, which adversely impacts the scooters' safety.

SUMMARY OF THE INVENTION

In view of the above-described problems, it is one objective of the invention to provide a scooter for kids of which the scooter head and the main body are locked via an embedded limit screw, thus preventing a 360 degree rotation of the scooter head around the main body, and the adjustment, disassembly, positioning and steering of the scooter are more convenient compared to conventional solutions.

To achieve the above objective, in accordance with one embodiment of the invention, there is provided a scooter for kids, comprising a scooter head and a main body connected to the scooter head. A rotating and positioning mechanism is disposed between the scooter head and the main body. The rotating and positioning mechanism comprises a front body and a rear body. The front body is integrated with the rear body via a fixer to form a rotatable body. A back surface of the rear body is provided with a socket, and a connection rod was disposed in the socket. An outer end of the connection rod is provided with a first button. The connection rod is sheathed with a first spring, and the first spring is disposed in the socket.

In accordance with one embodiment of the invention, one side of the rear body corresponding to the front body against the rear body is provided with a first connector. The first connector is inserted into one side of the front body and connected to the fixer. A top of the first connector is provided with a positioning carrier. The connection rod is inserted into the socket of the rear body and then into the front body. A joint of the front body and the scooter head is provided with a limit slot. A scooter head and a main body are locked via an embedded limit screw, so as to prevent a 360 degree rotation of the scooter head around the main body.

In a class of this embodiment, the positioning carrier comprises a connecting sheet and two first positioning pins. The first positioning pins are inserted and positioned in first positioning holes arranged on the front body. An end surface of the rear body facing the first positioning pins is provided with second positioning holes. The first positioning pins are inserted into the first positioning holes and are disposed in the second positioning holes.

In a class of this embodiment, the connecting sheet is provided with a screw hole, and the screw hole is provided with a first fixing screw from outside. The front body is made from high-intensitive synthetic rubber. The connecting sheet is soldered integratedly to the first positioning pins.

Preferably, the scooter for kids further comprises a T-shaped assembly comprising a T-shaped tube, a steel pin disposed in the T-shaped tube, and a U-shaped spring inserted in the steel pin, a telescopic mechanism of the T-shaped assembly, a tube base, a positioning mechanism of the tube base, a disassembly structure of the T-shaped assembly, and an automatic resetting and steering structure.

Preferably, the limit slot is cross-shaped and comprises four limit clamping slots. An upper end of the limit screw is provided with a limit clasp. The limit clasp is positioned and locked on one of the limit clamping slots.

Preferably, the U-shaped spring is disposed in the T-shaped tube. A lower end of the T-shaped tube is provided with a fixing sleeve. A lower end of the fixing sleeve is provided with a tube, and the T-shaped assembly is inserted into the fixing sleeve, and then into the tube. A front surface of the fixing sleeve is provided with a button slot. Two side surfaces of the button slot are provided with a fixing shaft hole, respectively. The button slot is provided with a second button. The second button is fixedly disposed on the button slot via a fixing shaft. One side of the fixing sleeve is provided with a handle slot, and the handle slot is provided with a handle. One side of the handle is provided with a first positioning hole. An upper end of the fixing sleeve facing the first positioning hole is provided with a fixing pin hole, and a fixing pin is inserted into the fixing pin hole, and then into the first positioning hole. The T-shaped assembly is inserted into the fixing sleeve and is fixed via a second fixing screw.

Preferably, the positioning mechanism of tube base comprises a main body and a tube base inserted into a hole of the main body. An upper surface of the main body is provided with a positioning slot. Two sides of an upper surface of the positioning slot are provided with a first screw hole. A second positioning pin is disposed in the positioning slot. One side of the second positioning pin is provided with a spring mounting hole adapted to position a second spring. One end of the second spring is disposed in the spring mounting hole, and another end contacts against a side wall of the positioning slot. The positioning slot is communicated with the tube base. A surface of the tube base facing the positioning slot is provided with at least one positioning pin hole. An upper end of the positioning slot is provided with a cover board. A surface of the cover board facing the first screw hole is provided with a second screw hole correspondingly. At least one locking screw is inserted into the second screw hole, and then into the first screw hole. An upper surface of the cover board is provided with a sliding slot, and the sliding slot penetrates through the whole cover board. A third button is disposed on the sliding slot, and a third screw hole is disposed on the center of the third button. A surface of the second positioning pin facing the third screw hole is provided with a fourth screw hole. The third button is locked onto the second positioning pin via a button screw.

Preferably, the automatic resetting and steering structure comprises an axle and a connecting sleeve. The axle is provided with a second slot. Two side surfaces of the axle facing the second slot are provided with a fixing axle hole respectively. One end of the connecting sleeve facing the second slot is provided with a second connector. The second connector comprises an arc-shaped head. A second positioning hole is disposed on and penetrates through the second connector. A mounting slot is disposed on a front end of the connector, and the mounting slot is provided with a torsion spring. The torsion spring is disposed in the second slot of the axle via the second connector. A fixing shaft is inserted through the axle, the second connector, and the torsion spring; specifically, the fixing shaft is inserted through the fixing axle hole of the axle, the second positioning hole of the second connector, and a mounting hole of the torsion spring.

Advantages of the scooter for kids according to embodiments of the invention are summarized as follows: the scooter for kids employs a plurality of novel mechanisms, so that adjustment, disassembly, positioning and steering of the scooter are convenient and safe, and that the scooter is comfortable to use. A scooter head and a main body are locked via an embedded limit screw, so as to prevent a 360 degree rotation of the scooter head around the main body, and thus security of the scooter is ensured.

BRIEF DESCRIPTION OF THE DRAWINGS

The invention is described hereinbelow with reference to the accompanying drawings, in which.

DETAILED DESCRIPTION OF THE EMBODIMENTS

For further illustrating the invention, experiments detailing a scooter for kids are described below. It should be noted that the following examples are intended to describe and not to limit the invention.

Figure 1:
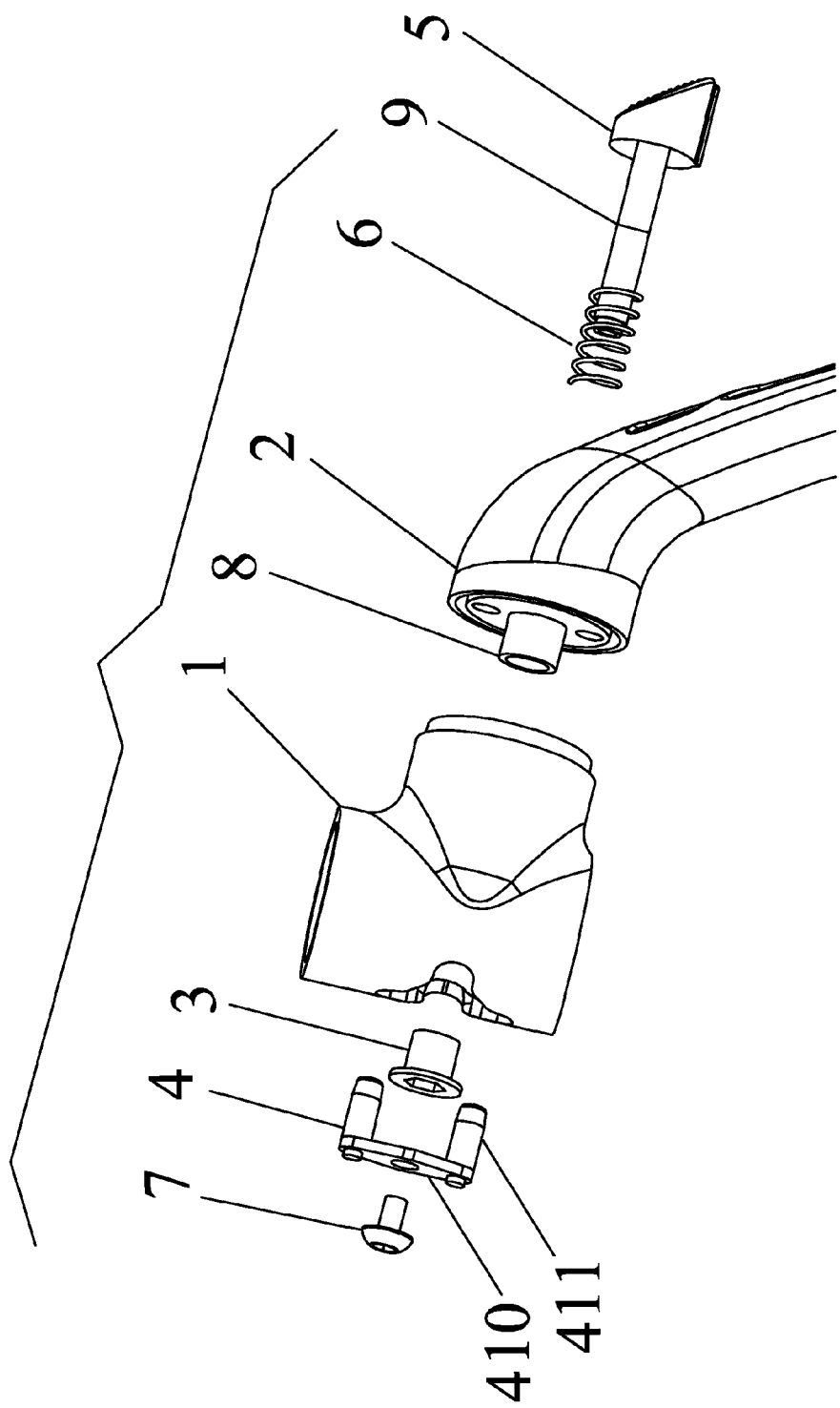
FIG. 1 is an exploded view of a rotating and positioning mechanism in accordance with one embodiment of the invention.
Figure 2:
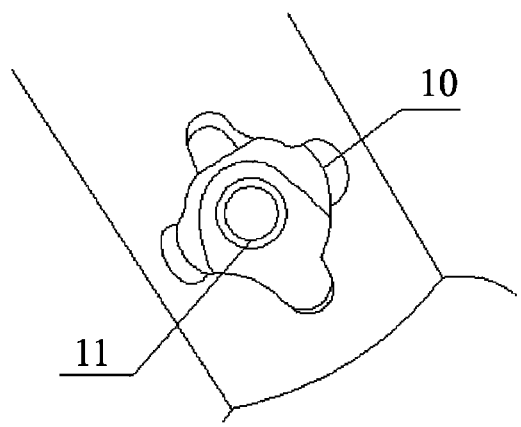
FIG. 2 is a partial enlarged view of a limit slot and a limit screw in accordance with one embodiment of the invention.
Figure 7:
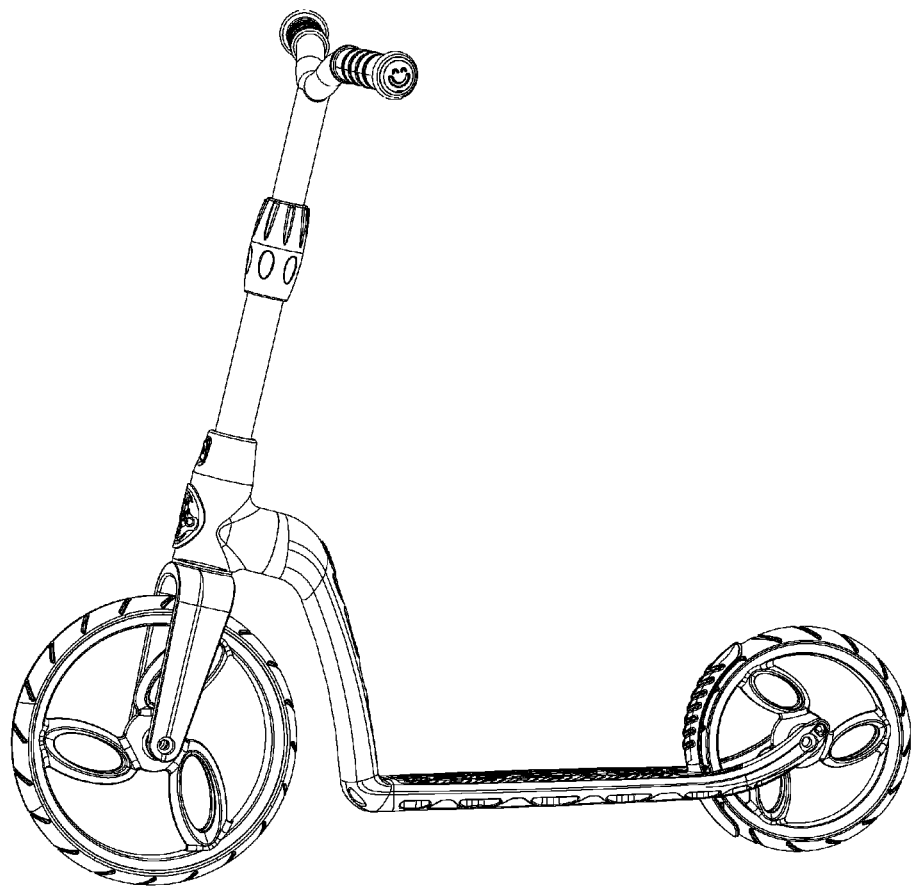
FIG. 7 is a schematic diagram of a scooter for kids in accordance with one embodiment of the invention.

As shown in FIGS. 1, 2, and 7, a scooter for kids, comprising a scooter head and a main body connected to the scooter head. A rotating and positioning mechanism is disposed between the scooter head and the main body. The rotating and positioning mechanism comprises a front body 1 and a rear body 2. The front body 1 is integrated with the rear body 2 via a fixer 8 to form a rotatable body. A back surface of the rear body 2 is provided with a socket, and a connection rod 9 was disposed in the socket. An outer end of the connection rod 9 is provided with a first button 5. The connection rod 9 is sheathed with a first spring 6, and the first spring 6 is disposed in the socket.

One side of the rear body corresponding to the front body 1 is provided with a first connector 3. The first connector 3 is inserted into one side of the front body 1 and connected to the fixer 8. The top of the first connector 3 is provided with a positioning carrier 4. The connection rod 9 is inserted into the socket of the rear body 2, and then into the front body 1. A joint of the front body 1 and the scooter head is provided with a limit slot 10. A scooter head and a main body are locked via an embedded limit screw 11, so as to prevent a 360 degree rotation of the scooter head around the main body.

The positioning carrier 4 comprises a connecting sheet 410 and two first positioning pins 411. The first positioning pins 411 are inserted and positioned in first positioning holes arranged on the front body 1. An end surface of the rear body 2 facing the first positioning pins are provided with second positioning holes. The first positioning pins 411 are inserted into the first positioning holes and are disposed in the second positioning holes.

The connecting sheet 410 is provided with a screw hole, and the screw hole is provided with a first fixing screw 7 from outside. The front body 1 is made from high-intensitive synthetic rubber. The connecting sheet 410 is soldered integratedly to the first positioning pins.

In use, the front body 1 is held by one hand, and the rear body 2 is held by another hand, meanwhile pressing the first button 5 by a thumb so that the rotatable body is able to rotate clockwise or anticlockwise. After the rotation, the first button 5 is released, and with the help of the elastic force of the first spring 6, the positioning carrier is automatically disposed in the front body 1.

The scooter for kids further comprises a telescopic mechanism of T-shaped tube, a positioning mechanism of tube base, a disassembly structure of T-shaped assembly, and an automatic resetting and steering structure.

The limit slot 10 is cross-shaped and comprises four limit clamping slots. An upper end of the limit screw 11 is provided with a limit clasp. The limit clasp is positioned and locked on one of the limit clamping slots.

Figure 6:
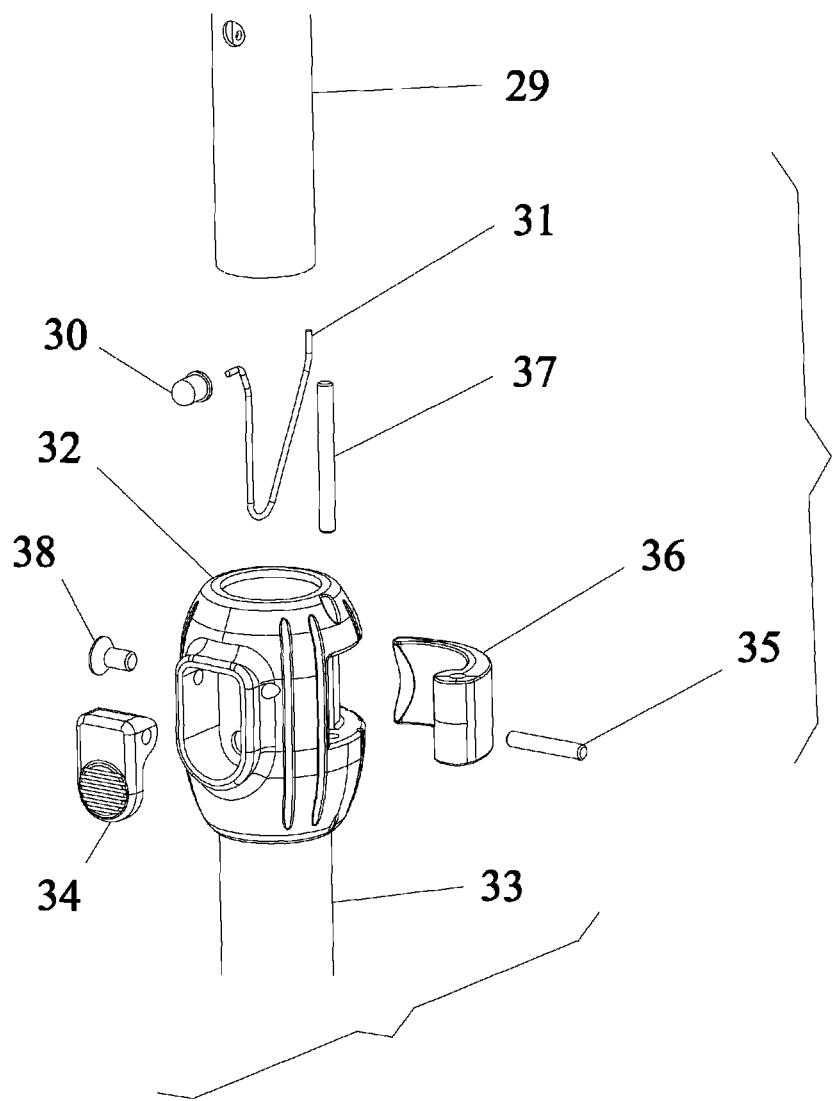
FIG. 6 is a schematic diagram of a telescopic mechanism of a T-shaped tube in accordance with one embodiment of the invention.

As shown in FIG. 6, the telescopic mechanism of T-shaped tube comprises a T-shaped tube 29, a steel pin 30 disposed in the T-shaped tube 29, and a T-shaped assembly 16 comprising a U-shaped spring 31 which is inserted in the steel pin 30. The U-shaped spring 31 is disposed in the T-shaped tube 29. A lower end of the T-shaped tube is provided with a fixing sleeve 32. A lower end of the fixing sleeve 32 is provided with a tube 33, and the T-shaped assembly is inserted into the fixing sleeve 32, and then into the tube 33. A front surface of the fixing sleeve 32 is provided with a first button slot. Two side surfaces of the first button slot are provided with a fixing shaft hole, respectively. The first button slot is provided with a second button 34. The second button 34 is fixedly disposed on the first button slot via a fixing shaft 35. One side of the fixing sleeve 35 is provided with a handle slot, and the handle slot is provided with a handle 36. One side of the handle 36 is provided with a first positioning hole. An upper end of the fixing sleeve 35 facing the first positioning hole is provided with a fixing pin hole, and a fixing pin 37 is inserted into the fixing pin hole, and then into the first positioning hole. The T-shaped assembly is inserted into the fixing sleeve and is fixed via a second fixing screw 38.

In use, a height of the T-shaped tube is adjustable according to a height of a user. The user pulls open the handle with one hand and presses the second button with a thumb, and another hand pulls the T-shaped tube so as to adjust the height. After the adjustment, the handle is pressed in. The adjustment is convenient and safe, and no tools are required. The telescopic mechanism of T-shaped tube features a simple and good appearance.

Figure 4:
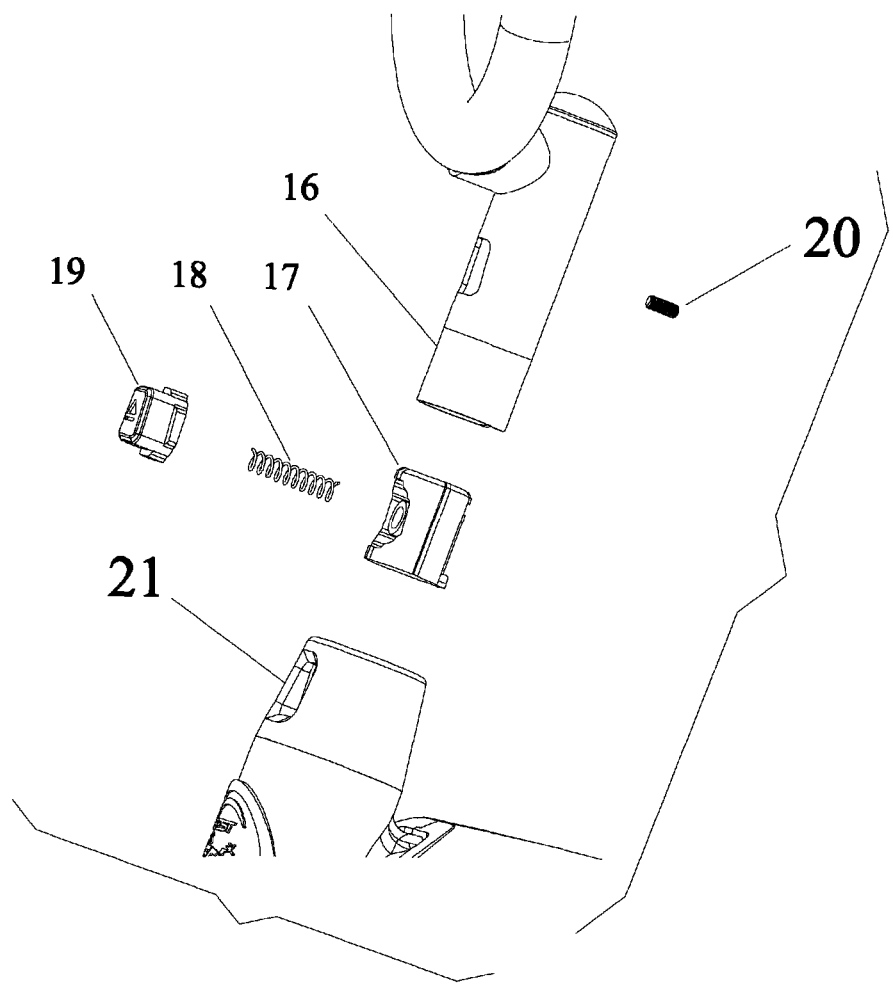
FIG. 4 is a schematic diagram of a disassembly mechanism of a T-shaped assembly in accordance with one embodiment of the invention.

As shown in FIG. 4, a lower end of the T-shaped assembly 16 is provided with a first mounting hole of positioning sleeve adapted to receive a positioning sleeve 17. One side of the positioning sleeve 17 is provided with a second mounting hole adapted to receive the third spring 18. The second mounting hole is disposed in a second button slot, and the second button slot is provided with a fourth button 19. One end of the third spring 18 is disposed in the fourth button 19. The fourth button 19, the third spring 18, and the positioning sleeve 17 are integrated as a whole, and are disposed in the T-shaped assembly. The T-shaped assembly 16 and the positioning sleeve 17 are locked via a positioning screw. The lower end of the T-shaped assembly 16 is provided with a head tube body 21.

The fourth button and the third spring are disposed in the positioning sleeve, and are integrated with the T-shaped assembly. Then, the positioning screw is employed to fix the T-shaped assembly and the positioning sleeve, and the head tube body is integrated with the T-shaped assembly. The head tube body is provided with a tube positioning slot and a tube positioning hole so as to integrate with T-shaped assembly. During the disassembly process, a thumb of one hand of the user presses the fourth button, and another hand pulls out the T-shaped assembly, thus the disassembly of the T-shaped assembly is finished, and no tools are required.

Figure 5:
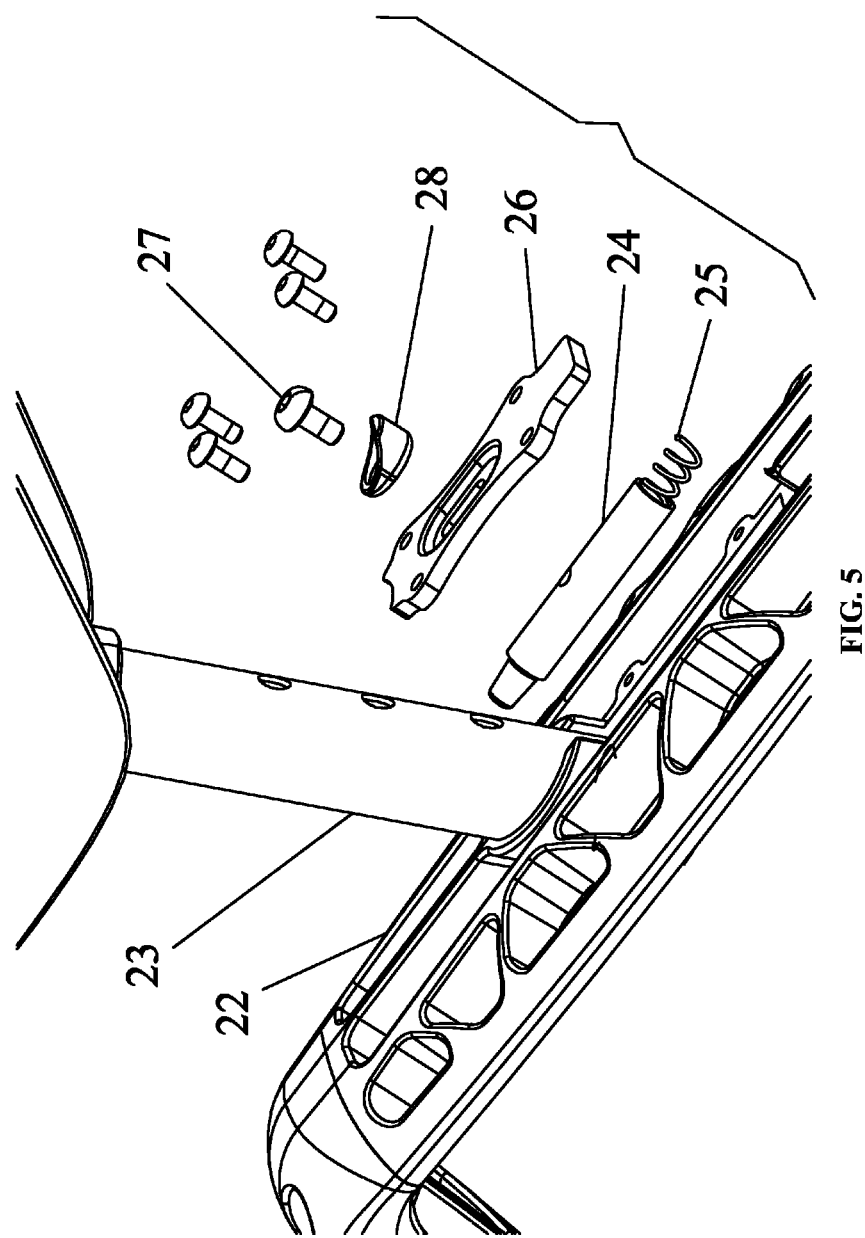
FIG. 5 is a schematic diagram of a positioning mechanism of a tube base in accordance with one embodiment of the invention.

As shown in FIG. 5, the positioning mechanism of tube base comprises a main body 22 and a tube base 23 inserted into a hole of the main body. An upper surface of the main body is provided with a positioning slot. Two sides of an upper surface of the positioning slot are provided with a first screw hole. A second positioning pin 24 is disposed in the positioning slot. One side of the second positioning pin 24 is provided with a third mounting hole adapted to position a second spring 25. One end of the second spring 25 is disposed in the third mounting hole, and another end contacts against a side wall of the positioning slot. The positioning slot is communicated with the tube base. A surface of the tube base facing the positioning slot is provided with at least one positioning pin hole. An upper end of the positioning slot is provided with a cover board 26. A surface of the cover board 26 facing the first screw hole is provided with a second screw hole correspondingly. At least one locking screw 27 is inserted into the second screw hole and the first screw hole. An upper surface of the cover board 26 is provided with a sliding slot, and the sliding slot penetrates through the whole cover board. A third button 28 is disposed on the sliding slot, and a third screw hole is disposed on the center of the third button 28. A surface of the second positioning pin facing the third screw hole is provided with a fourth screw hole. The third button is locked onto the second positioning pin 24 via a button screw.

In use, one hand of the user pulls the third button backwards, and another hand inserts the tube base into the main body. Then the third button is released, and with the help of the elastic force of the second spring, the second positioning pin automatically inserts into the positioning pin hole. The positioning mechanism of tube base is easy to operate, and features a simple and fine appearance.

Figure 3:
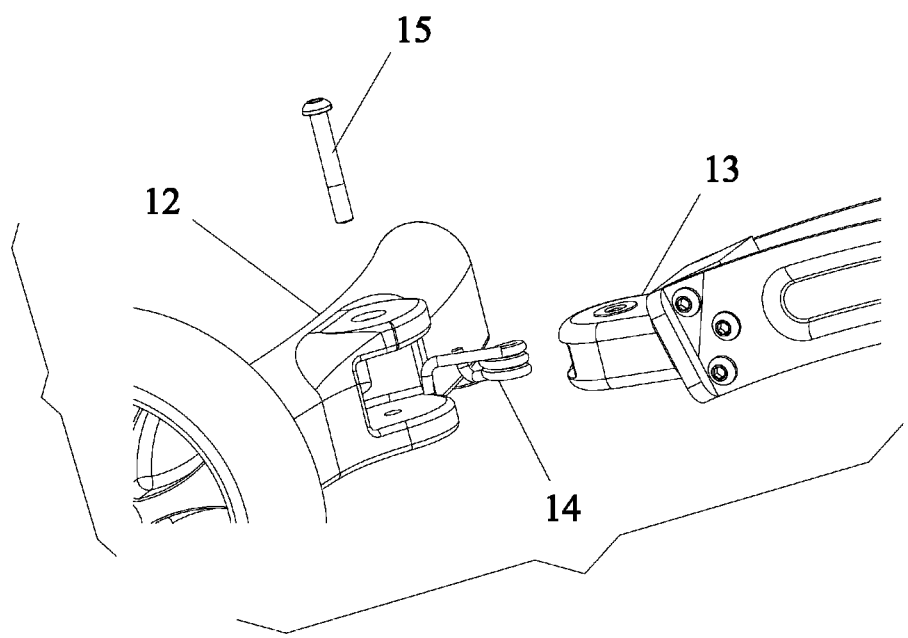
FIG. 3 is a schematic diagram of an automatic resetting and steering structure in accordance with one embodiment of the invention.

As shown in FIG. 3, the automatic resetting and steering structure comprises an axle 12 and a connecting sleeve 13. The axle 12 is provided with a second slot. Two side surfaces of the axle facing the second slot are provided with a fixing axle hole respectively. One end of the connecting sleeve facing the second slot is provided with a second connector. The second connector comprises an arc-shaped head. A second positioning hole is disposed on and penetrates through the second connector. A mounting slot is disposed on a front end of the connector, and the mounting slot is provided with a torsion spring 14. The torsion spring 14 is disposed in the second slot of the axle via the second connector. A fixing shaft 15 is inserted through the axle, the second connector, and the torsion spring; specifically, the fixing shaft 15 is inserted through the fixing axle hole of the axle 12, the second positioning hole of the second connector, and a fourth mounting hole of the torsion spring 14.

Advantages of the scooter for kids according to embodiments of the invention are summarized as follows: the scooter for kids employs a plurality of novel mechanisms, so that adjustment, disassembly, positioning and steering of the scooter are convenient and safe, and that the scooter is comfortable to use. A scooter head and a main body are locked via an embedded limit screw, so as to prevent a 360 degree rotation of the scooter head around the main body, and thus security of the scooter is ensured.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:
1. A scooter, comprising:
   a scooter head;
   a main body, the main body being connected to the scooter head; and
   a rotating and positioning mechanism, the rotating and positioning mechanism comprising a front body and a rear body;
wherein
   the rotating and positioning mechanism is disposed between the scooter head and the main body;
   the front body is integrated with the rear body via a fixer to form a rotatable body; a back surface of the rear body is provided with a socket, and a connection rod was disposed in the socket; an outer end of the connection rod is provided with a first button; the connection rod is sheathed with a first spring, and the first spring is disposed in the socket;
   one side of the rear body corresponding to the front body is provided with a first connector; the first connector is inserted into one side of the front body and connected to the fixer; a top of the first connector is provided with a positioning carrier; the connection rod is inserted into the socket of the rear body, and then into the front body; a joint of the front body and the scooter head is provided with a limit slot; the scooter head and the main body are locked via an embedded limit screw, so as to prevent a 360 degree rotation of the scooter head around the main body;
   the positioning carrier comprises a connecting sheet and two first positioning pins; the first positioning pins are inserted and positioned in first positioning holes arranged on the front body; an end surface of the rear body facing the first positioning pins are provided with second positioning holes; the first positioning pins pass the first positioning holes and are inserted into the second positioning holes;
   the connecting sheet is provided with a screw hole, and the screw hole is provided with a first fixing screw from outside; the front body is made from synthetic rubber; the connecting sheet is soldered integratedly to the first positioning pins.
2. The scooter of claim 1, wherein the scooter further comprises a T-shaped assembly comprising a T-shaped tube, a steel pin disposed in the T-shaped tube, and a U-shaped spring inserted in the steel pin, a telescopic mechanism of the T-shaped assembly, a tube base, a positioning mecha- nism of the tube base, a disassembly structure of the T-shaped assembly, and an automatic resetting and steering structure.

3. The scooter of claim 2, wherein
the U-shaped spring is disposed in the T-shaped tube; a lower end of the T-shaped tube is provided with a fixing sleeve; a lower end of the fixing sleeve is provided with a tube, and the T-shaped assembly is inserted into the fixing sleeve, and then enters the tube;
a front surface of the fixing sleeve is provided with a button slot; two side surfaces of the button slot are provided with a fixing shaft hole, respectively; the button slot is provided with a second button, and the second button is fixedly disposed on the button slot via a fixing shaft; and
one side of the fixing sleeve is provided with a handle slot, and the handle slot is provided with a handle; one side of the handle is provided with a first positioning hole; an upper end of the fixing sleeve facing the first positioning hole is provided with a fixing pin hole, and a fixing pin is inserted into the fixing pin hole, and then into the first positioning hole; the T-shaped assembly is inserted into the fixing sleeve and is fixed via a second fixing screw.

4. The scooter of claim 2, wherein
the positioning mechanism of the tube base comprises a main body, and the tube base is inserted into a hole of the main body; an upper surface of the main body is provided with a positioning slot;
two sides of an upper surface of the positioning slot are provided with a first screw hole; a second positioning pin is disposed in the positioning slot; one side of the second positioning pin is provided with a spring mounting hole adapted to position a second spring;
one end of the second spring is disposed in the spring mounting hole, and another end contacts against a side wall of the positioning slot; the positioning slot is communicated with the tube base; a surface of the tube base facing the positioning slot is provided with at least one positioning pin hole; an upper end of the positioning slot is provided with a cover board; a surface of the cover board facing the first screw hole is provided with a second screw hole correspondingly;
at least one locking screw is inserted into the second screw hole and the first screw hole; an upper surface of the cover board is provided with a sliding slot, and the sliding slot penetrates through the whole cover board; a third button is disposed on the sliding slot, and a third screw hole is disposed on the center of the third button; and
a surface of the second positioning pin facing the third screw hole is provided with a fourth screw hole; the third button is locked onto the second positioning pin via a button screw.

5. The scooter of claim 2, wherein
the automatic resetting and steering structure comprises an axle and a connecting sleeve; the axle is provided with a second slot; two side surfaces of the axle facing the second slot are provided with a fixing axle hole respectively;
one end of the connecting sleeve facing the second slot is provided with a second connector; the second connector comprises an arc-shaped head; a second positioning hole is disposed on and penetrates through the second connector; a mounting slot is disposed on a front end of the connector, and the mounting slot is provided with a torsion spring; and
the torsion spring is disposed in the second slot of the axle via the second connector; a fixing shaft is disposed to penetrate through the fixing axle hole of the axle, the second positioning hole of the second connector, and a mounting hole of the torsion spring.

6. The scooter of claim 1, wherein the limit slot is cross-shaped and comprises four limit clamping slots; an upper end of the limit screw is provided with a limit clasp; the limit clasp is positioned and locked on one of the limit clamping slots.

\* \* \* \* \*